United States Patent
Chng et al.

(10) Patent No.: US 6,574,723 B2
(45) Date of Patent: Jun. 3, 2003

(54) METHOD OF OVERFLOW-BASED DEFECT MANAGEMENT REPRESENTATION

(75) Inventors: Yong Peng Chng, Singapore (SG); Aik Chuan Lim, Singapore (SG); Patrick Tai Heng Wong, Singapore (SG); Chew Boon Toh, Singapore (SG); Steven Tian Chye Cheok, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 67 days.

(21) Appl. No.: 09/860,826

(22) Filed: May 18, 2001

(65) Prior Publication Data

US 2002/0015248 A1 Feb. 7, 2002

Related U.S. Application Data

(60) Provisional application No. 60/205,928, filed on May 22, 2000.

(51) Int. Cl.$^7$ ................................................. G06F 12/10
(52) U.S. Cl. .................... 711/217; 711/112; 711/114; 711/154; 711/220; 714/1; 714/6; 714/8
(58) Field of Search .................................. 711/112, 114, 711/154, 170, 217, 220; 360/47; 714/1, 6, 8

(56) References Cited

U.S. PATENT DOCUMENTS

| | | | | |
|---|---|---|---|---|
| 4,935,825 A | * | 6/1990 | Worrell et al. | 360/54 |
| 5,271,018 A | * | 12/1993 | Chan | 360/48 |
| 5,541,903 A | * | 7/1996 | Funahashi et al. | 369/54 |
| 5,548,572 A | * | 8/1996 | Kulakowski et al. | 369/275.1 |
| 5,615,190 A | * | 3/1997 | Best et al. | 369/58 |
| 5,848,438 A | * | 12/1998 | Nemazie et al. | 711/201 |
| 5,937,435 A | * | 8/1999 | Dobbek et al. | 711/202 |
| 5,956,307 A | * | 9/1999 | Koudo et al. | 369/124.04 |
| 6,025,966 A | * | 2/2000 | Nemazie et al. | 360/53 |
| 6,098,187 A | * | 8/2000 | Takahashi | 714/741 |

* cited by examiner

*Primary Examiner*—T. V. Nguyen
(74) *Attorney, Agent, or Firm*—David K. Lucent; Kirk A. Cesari; Derek J. Berger

(57) ABSTRACT

A method of storing values that involves splitting each value into a n-bit value and an overflow value, and storing, in a main table, the n-bit values in order of increasing magnitude of the values. For each overflow value, the position of the smallest n-bit value is stored in an overflow table. To retrieve a value, the position of the corresponding n-bit value is compared to the positions stored in the overflow value to determine the overflow value of the n-bit value. The actual value is then obtained from the n-bit value and its overflow value.

11 Claims, 4 Drawing Sheets

METHOD OF OVERFLOW-BASED DEFECT MANAGEMENT REPRESENTATION

RELATED APPLICATIONS

The present application claims benefit of the U.S. provisional patent application No. 60/205,928, filed May 22, 2000.

FIELD OF THE INVENTION

The present invention relates generally to disc drives, and in particular to media defect management schemes.

BACKGROUND OF THE INVENTION

Defect management schemes in a disc drive identify segments of the disc surface that are defective and which cannot be used to store data. Such defects may be caused by a number of sources, including thermal asperity, dust particles or other contaminants. These defective locations need to be identified and coded as no useful information can be recorded at these defective sites.

Drive certification is performed as part of the manufacturing process to identify defects on the media. In a typical full slip defect management scheme, all defective sectors found are characterized by a slip count parameter. The drive electronics uses this parameter to skip over the defective sectors. The accumulated slip and the cylinder location are recorded in the defect slippage field and the cylinder field respectively. Both these fields are a single word size parameter. This implies that the largest number of accumulated slips that can be recorded is 65535. This limitation poses a potential problem as the capacity of disc drives increases and the potential number of slips may exceed this number.

If a track or cylinder is mapped out due to bad servo bursts, the accumulated slip count increases tremendously, and the slip count may exceed the limit.

Following the current trend in the disc drive industry to increase drive capacity by increasing the number of tracks per inch, a similar problem will arise when the number of cylinders in a drive exceed 65535, since the cylinder field is a single word parameter.

A natural solution is to use an additional memory byte or word to represent the slip count or cylinder count, and thus avoid any possibility of parameter overflow. Unfortunately, this is not a feasible solution as buffer memory is both scarce and expensive in the disc drive electronics system. For example, if an additional byte is added for the cylinder and slip count fields, the additional memory required for the entire defect table will be 2 bytes multiplied by the number of defect entries. For an 8K defect entry system, an additional 16K bytes will be required.

There is clearly an unmet need for some way to overcome this memory limitation at acceptable cost.

SUMMARY OF THE INVENTION

In accordance with the invention, there is provided a method for storing values, some of the values being wider than n bits. The method is especially useful in a disc drive having n-bit wide memory allocated to the storage of such values.

According to a most preferred embodiment, the method involves obtaining the difference between each of the values and a value $k2^n$. The value k is chosen as the smallest integer for the difference to be less than $2^n$. The differences are stored in a n-bit wide first memory in order of increasing magnitude of the values. Each of the differences is referenced by an address. For each k value, the address of the smallest difference is stored in a second memory as an overflow address. The method may further include updating the addresses in the first memory and, if necessary, in the second memory, when a new difference is inserted into the first memory. In this manner, the invention allows for the storage of values that may be wider than n bits without resorting to allocating more than n bits to store each of the values.

The method is applicable whether or not the values are accumulative. If the values are accumulative in nature, the n-bit values are updated along with any required updating of the addresses when a new difference is inserted into the first table.

To retrieve a value, the address of the difference stored in the first memory is compared with the overflow addresses stored in a second memory. The value of $2^n$ is added to the difference if an overflow address is equal to or greater than the address. The comparing and adding steps are repeated for each overflow address less than the address of the difference. The final sum is the value to be retrieved.

Thus, it can be understood that the present invention can be implemented with minor code changes and yet bring about significant increase in the magnitude of the values that can be stored. These and various other features as well as advantages, which characterize the present invention, will be apparent from the following detailed description.

DETAILED DESCRIPTION

Figure 1:
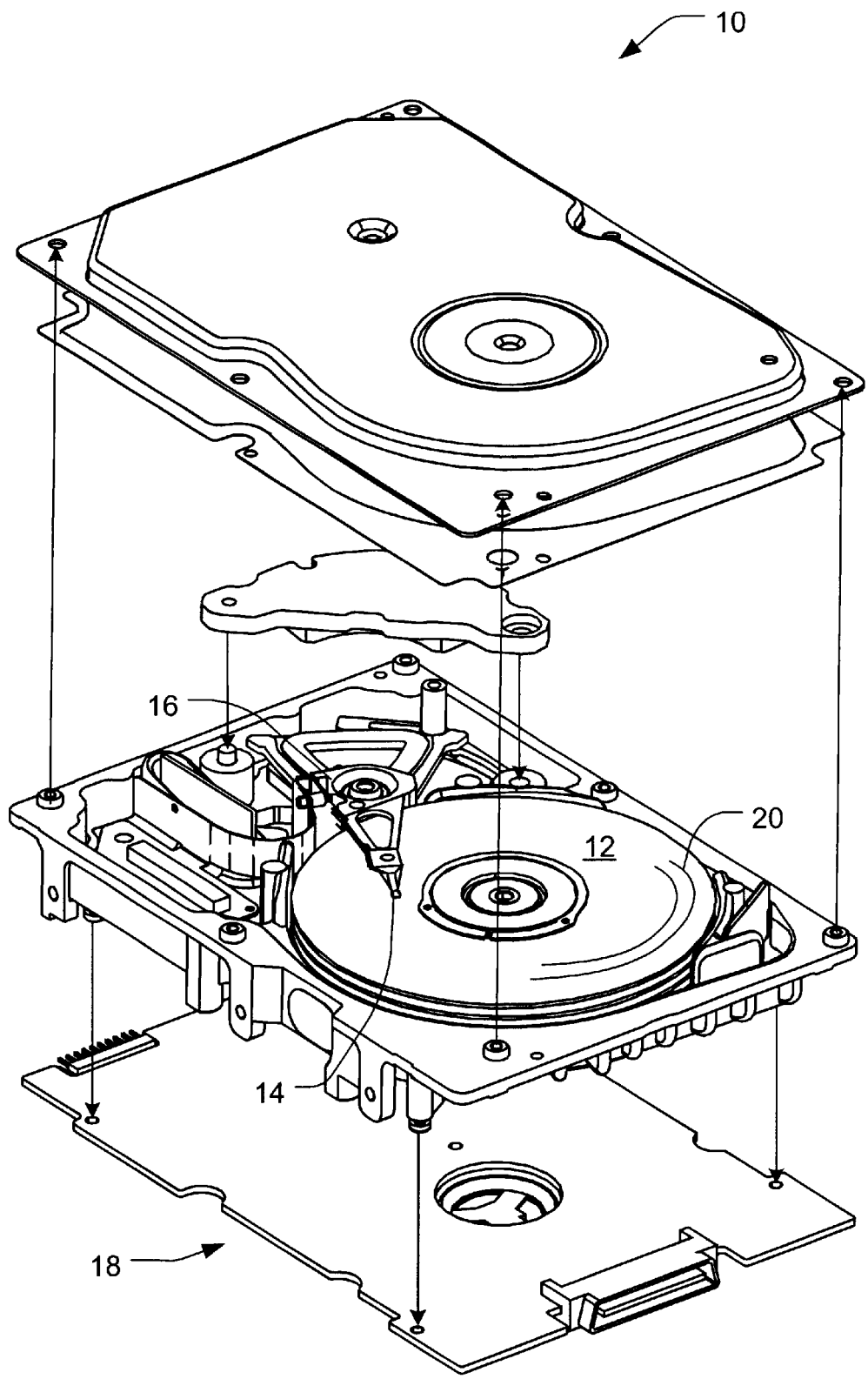
FIG. 1 shows an exemplary disc drive.

A preferred embodiment of the present invention will be described with the aid of the attached drawings. Shown in FIG. 1 is an exemplary disc drive such as one in which the present invention may be implemented. The disc drive 10 includes at least one disc 12 to which data can be recorded and retrieved from by read/write heads 14 supported by an actuator assembly 16. Servo electronics 18 operably connected to the actuator assembly controls the position of the read/write heads 14.

The disc is divided into tracks 20. Tracks which are the same distance from the center of the discs are referenced by the same cylinder number. A head number is used for designating the different disc surfaces. Each track 20 is further divided into a number of sectors 22, each sector being an addressable location for data storage. The physical address of a sector may therefore be expressed in the Cylinder/Head/Sector (CHS) format.

A defect location is represented in a defect table by its cylinder, head, sector and its span. The defect span can be obtained by subtracting the previous defect entry slip count from the current slip count. Generally, a sector is also identified by a logical address. While the physical address refers to the actual location of the sector on the disc, the logical address is the address used by an associated host system to read data from and write data to the disc drive.

When a sector is found to be not suitable for use in storing data, its logical address is assigned to another sector so that the defective sector will not be utilized for storing data. In this manner, the host system is presented with an apparently contiguous series of memory storage units.

Various schemes have been devised to skip over defective sectors, whether identified at the time of drive certification or found to have become defective in the course of use. Typically such schemes involve writing data to each sector and reading back the data to determine if the sector is suitable for use in storing data. If the sector is found to be defective, the logical address of the sector is assigned to the next good sector. It is therefore possible to build a defect table that identifies defective sectors by their physical addresses and the corresponding slip counts. The slip count is an accumulative counter that serves to indicate the relative difference between the logical address and the physical address.

The defect table is usually stored in a reserved part of the disc. When the disc drive is powered up for operation, the defect table is transferred to the buffer memory. There, it is accessed by the drive electronics to direct the disc drive to skip over the defective sectors during operation. Generally, the cylinder numbers, slip counts and indices in the following examples are expressed in hexadecimal, and it is assumed that the memory space allocated to the storage of each cylinder number or slip count is 16 bits.

Figure 2:
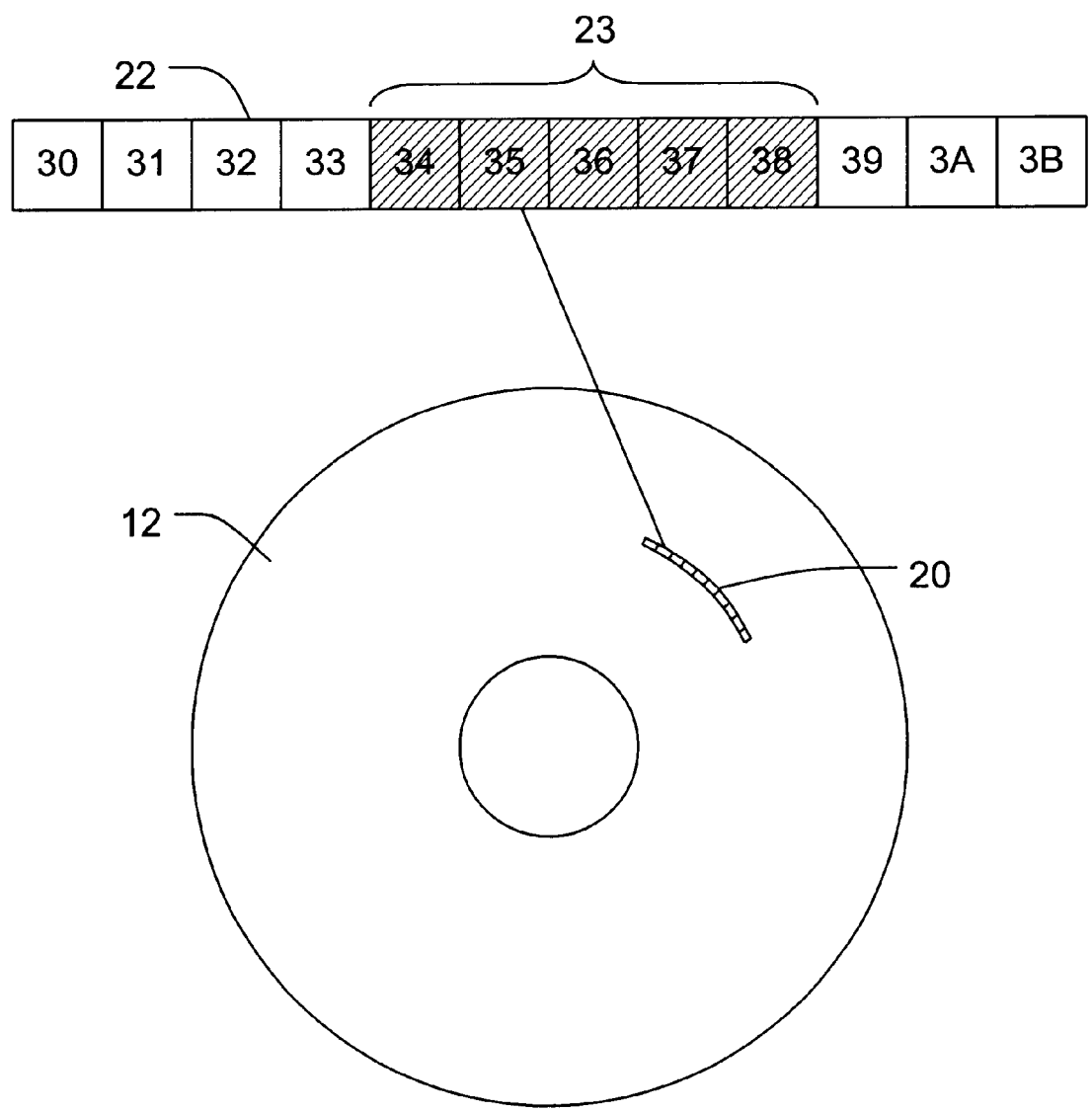
FIG. 2 provides a schematic illustration of defective sectors in a track.
Figure 3:
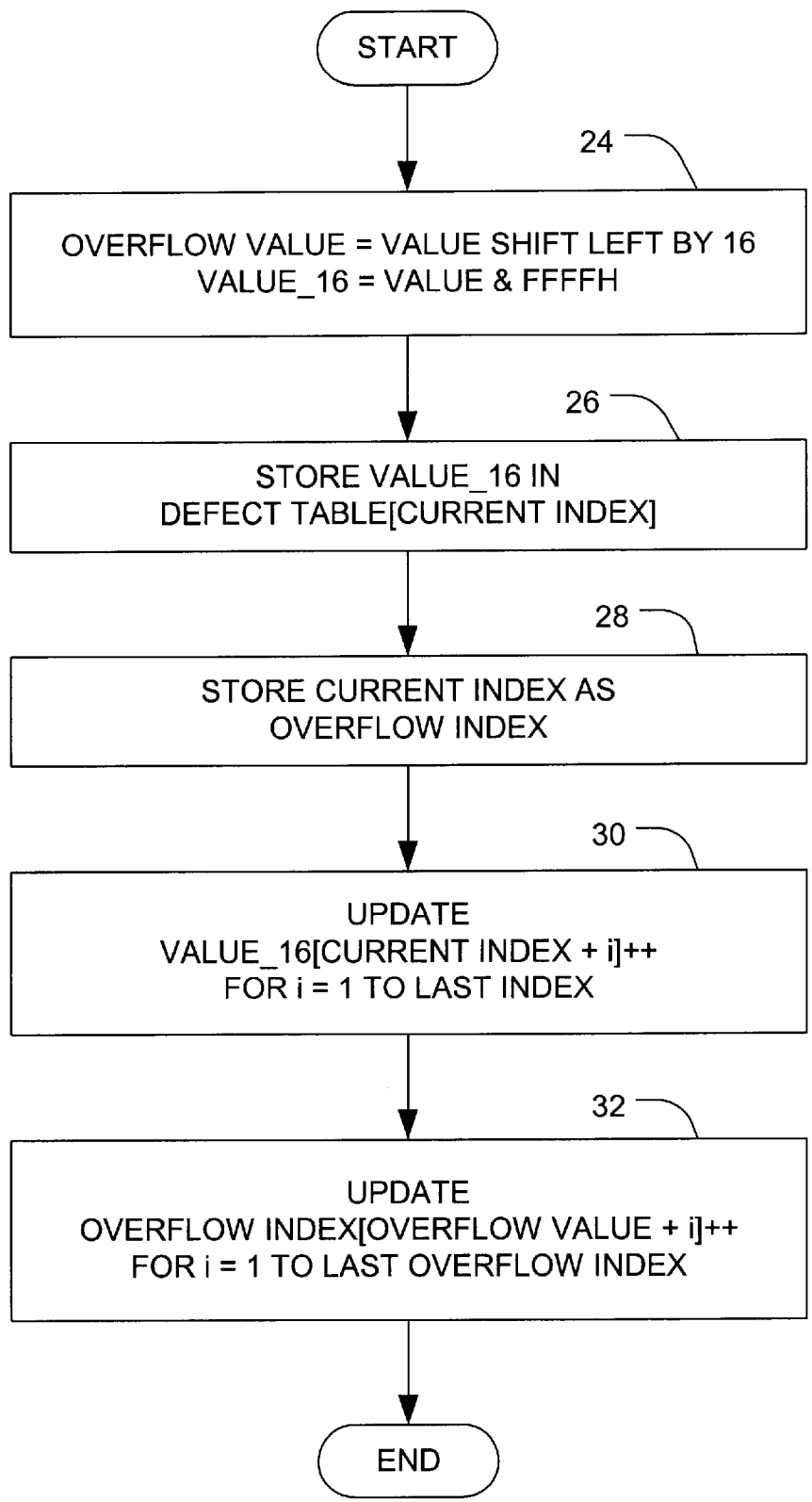
FIG. 3 is a flowchart showing the storage of a number according to a preferred embodiment of the present invention.

Table 1 below represents a defect table in which a new entry representing defective sectors is inserted. Supposing that in this example the new entry represents defects at Cylinder=FF2E, Head=0, Sector=34 with Span=5 as shown by the shaded boxes 23 in FIG. 2. This new entry will be inserted at Index=1013 so that the defect entries remain in ascending order of the CHS address. The new defect entry appears as Cylinder=FF2E, Head=0, Sector=34, Slip= (FFFD+5)=10002. Making reference to step 24 in FIG. 3, the Slip value is split into a 16-bit value of 0002 and an overflow value of 1. The value that is actually stored in the defect table is the 16-bit value as shown in step 24. The address of this defect entry, which is given by the Index, is stored in a second table as shown in Table 2, here referred to as an overflow table, unless the overflow table already stores a smaller or equal overflow Index value for the same overflow value, as shown in step 28.

TABLE 1

| Index | Cylinder | Head | Sector | Slip |
| --- | --- | --- | --- | --- |
| 1010 | EE20 | 0 | 23 | FFEC |
| 1011 | FA20 | 1 | 34 | FFF2 |
| 1012 | FD34 | 0 | 5A | FFFD |
| 1013 | FF2E | 0 | 34 | 0002 |

TABLE 2

| Overflow Index |
| --- |
| 1013 |

The Slip counts of all the defect entries, if any, below the new defect entry are updated by the addition of the Span associated with the new defect entry, as shown in step 30. For example, if Table 3 represents the defect entries in the defect table before the new defect entry of Cylinder=FF2E, Head=0, Sector=34 with Span=5 is inserted, Table 4 shows the state of the defect table after the insertion and updating is completed.

TABLE 3

| Index | Cylinder | Head | Sector | Slip |
| --- | --- | --- | --- | --- |
| 1010 | EE20 | 0 | 23 | FFEC |
| 1011 | FA20 | 1 | 34 | FFF2 |
| 1012 | FD34 | 0 | 5A | FFFD |
| 1013 | FFE2 | 0 | 2F | 001A |

The defect entry that used to have an address of Index= 1013, and now addressed by Index=1014, has its Slip count increased from 1001A to (1001A+5)=1001F. This new Slip count is similarly split into a 16-bit value of 001F and an overflow value of 1. The actual value stored in the defect table is 001F. Of all the defect entries that are associated with the same overflow value, the address of the defect entry having the smallest Index value is that which is stored in the overflow table. In this example, the first entry in the overflow table remains as 1013.

TABLE 4

| Index | Cylinder | Head | Sector | Slip |
| --- | --- | --- | --- | --- |
| 1010 | EE20 | 0 | 23 | FFEC |
| 1011 | FA20 | 1 | 34 | FFF2 |
| 1012 | FD34 | 0 | 5A | FFFD |
| 1013 | FF2E | 0 | 34 | 0002 |
| 1014 | FFE2 | 0 | 2F | 001F |

In another embodiment where the actual Slip count exceeds 1FFFF and the memory allocated to the defect table for the storage of the Slip value remains at 16 bits, the overflow table will have two entries. The first being the address of the first defect entry having a Slip count greater than FFFF, and the second being the address of the first defect entry having a Slip count greater than 1FFFF. This can be extrapolated to store very large numbers. For example, to store the number 30104, the 16-bit value 0104 is obtained and stored in the defect table. The overflow value=3. If this defect entry is the first defect entry associated with the same overflow value of 3, the address of this defect entry will be stored in the overflow table. If the overflow table contains an existing overflow index for the same overflow value, and the existing overflow index points to a larger address than the new defect entry with the same overflow value, the address of the new defect entry will replace the existing overflow index in the overflow table, as in step 32. If the existing overflow index in the overflow table points to an address that is smaller or equal to that of the new entry, for the same overflow value, the existing overflow index is retained.

Figure 4:
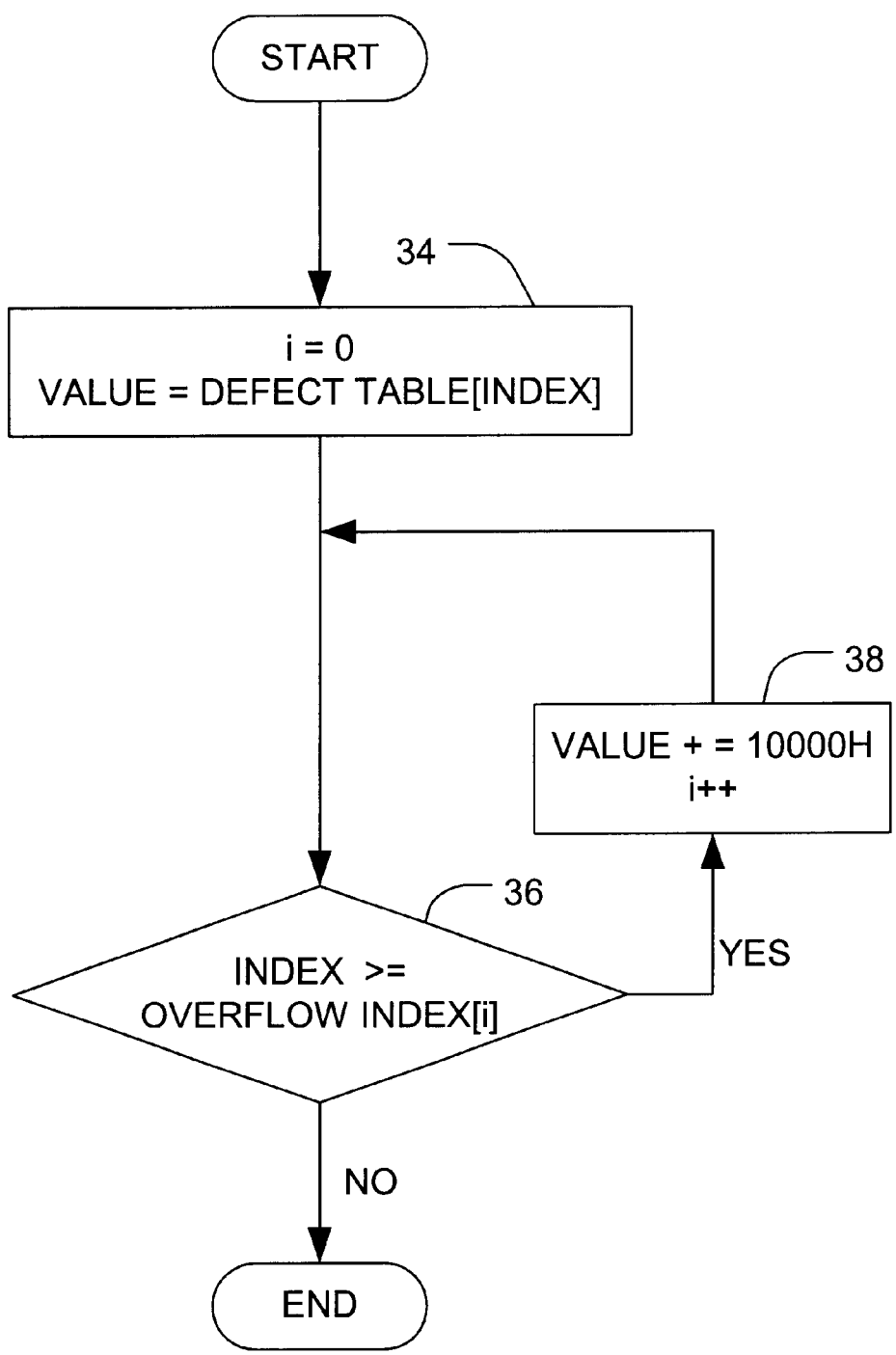
FIG. 4 is a flowchart of a preferred method of reading back the stored number.

To retrieve the actual slip count of a defect entry, its address is compared with the overflow address stored in the overflow table. One preferred embodiment is illustrated by steps 34, 36 and 38 of a flowchart in FIG. 4. Referring back to the example of Table 1, to retrieve the Slip count of the defect entry stored at Index=1013, the Index value 1013 is compared with each overflow index in the overflow table, until the Index value is found to be smaller than the overflow index. For every overflow index that is less than or equal to the Index value, the Slip value is incremented by 10000. In this example, the actual Slip count of 1001A is thus obtained.

It is envisaged that the number of cylinders may one day exceed FFFF. The present invention provides a way to circumvent a memory limitation problem that may potentially arise in that situation. In one embodiment of the present invention, there is provided another overflow table, here referred to as the cylinder overflow table, that is configured to store a cylinder overflow index or cylinder overflow indices.

Consider, for example, the insertion of a defect entry having Cylinder=10213, Head=1, Sector=12E, Span=DF at Index=1015 in a defect table represented by Table 5.

TABLE 5

| Index | Cylinder | Head | Sector | Slip |
|-------|----------|------|--------|------|
| 1010  | EE20     | 0    | 23     | FFEC |
| 1011  | FA20     | 1    | 34     | FFF2 |
| 1012  | FD34     | 0    | 5A     | FFFD |
| 1013  | FF2E     | 0    | 34     | 0002 |
| 1014  | FFE2     | 0    | 2F     | 001F |
| 1015  | 0213     | 1    | 12E    | 00FE |

The Cylinder number is split into a 16-bit value of 0213 and a cylinder overflow of 1. The 16-bit value is stored in the defect table. The address of the defect entry Index=1015 is stored in the cylinder overflow table since this is the first defect entry with a Cylinder number larger than FFFF. Table 6 shows the cylinder overflow table for this case.

TABLE 6

| Cylinder Overflow Index |
|-------------------------|
| 1015                    |

The Slip count of this defect entry=DF+1001F=100FE. The value of 00FE is stored in the defect table. The slip count overflow index that is stored in a slip count overflow table is not changed since the first defect entry to have a Slip count exceed FFFF remains as that associated with Index=1013.

If another defect entry having Cylinder=1012E, Head=1, Sector=0, Span=4, is inserted into the defect table, it will be inserted at Index=1015. The defect entry previously at Index=1015 will acquire a new Index of 1016, as shown in Table 7. The resultant defect table has 012E stored under Cylinder at Index=1015, and 0213 stored under Cylinder at Index=1016. The Slip count of the defect entry now at Index=1016 is updated from 00FE to 0102 after adding the Span of 4 introduced by the defect entry at Index=1015.

TABLE 7

| Index | Cylinder | Head | Sector | Slip |
|-------|----------|------|--------|------|
| 1010  | EE20     | 0    | 23     | FFEC |
| 1011  | FA20     | 1    | 34     | FFF2 |
| 1012  | FD34     | 0    | 5A     | FFFD |
| 1013  | FF2E     | 0    | 34     | 0002 |
| 1014  | FFE2     | 0    | 2F     | 001F |
| 1015  | 012E     | 1    | 0      | 0023 |
| 1016  | 0213     | 1    | 12E    | 0102 |

To retrieve the actual Cylinder number for a defect entry at any given Index, the Cylinder number stored in the defect table is increased by 10000 for every cylinder overflow index found to be less than or equal to the Index.

To support a maximum of 256K cylinders or slip counts, an overflow table with 3 words of memory to store 3 overflow indices is needed. In general, the largest number (cylinder number or slip counts) that can be supported by a system of the present invention is given by $((m+1)(w+1)-1)$, where m is the largest number that can be stored in the defect table alone and where w is the number of words allocated to the overflow table.

It has already been shown that the invention is flexible, and allows for the storage of numbers like cylinder numbers and accumulative numbers like slip counts. It is to be understood that other numbers may be stored efficiently in generally the same manner, with slight modifications to accommodate any special characteristics of the numbers. In other words, only minor code changes are required for the present invention to be applied to existing storage systems. This is an advantage as a complete redesign of the entire defect table will not be required. Neither is there a need for the buffer memory to be increased.

Another situation which may be encountered is described below with reference to Table 8 which represents a defect table and Table 9 which represents an overflow table for the Slip count.

TABLE 8

| Index | Cylinder | Head | Sector | Slip |
|-------|----------|------|--------|------|
| 1011  | FA20     | 1    | 24     | FFF2 |
| 1012  | FA20     | 1    | 5A     | FFFD |
| 1013  | FA20     | 1    | 6B     | 0004 |

TABLE 9

| Slip Overflow Index |
|---------------------|
| 1013                |

If a new defect entry of Cylinder=FA20, Head=1, Sector=65 with Span=6 is inserted into the defect table, the defect entries at Index=1012 and Index=1013 will be merged, with the new entry, into a single defect entry at Index=1012, giving the defect table of Table 10. The overflow address in the overflow table, in this example, becomes 1012, as shown in Table 11, because after the merger, the defect entry having the smallest difference for the overflow value of 1 is the defect entry having an address of Index=1012.

TABLE 10

| Index | Cylinder | Head | Sector | Slip |
|-------|----------|------|--------|------|
| 1011  | FA20     | 1    | 24     | FFF2 |
| 1012  | FA20     | 1    | 5A     | 000A |

TABLE 11

| Slip Overflow Index |
|---------------------|
| 1012                |

Tables 13 represents a Slip overflow table before a new defect entry of Cylinder=EE20, Head=0, Sector=40, Span=4, is inserted into the defect table represented by Table 12.

TABLE 12

| Index | Cylinder | Head | Sector | Slip |
|-------|----------|------|--------|------|
| 1010  | EE20     | 0    | 23     | FFEC |
| 1011  | EE20     | 0    | 34     | FFF3 |
| 1012  | EE20     | 0    | 44     | 0000 |

TABLE 13

Slip Overflow Index

1012

The new defect entry can be merged with the defect entry at Index=1012, giving the entries as shown in Table 14.

TABLE 14

| Index | Cylinder | Head | Sector | Slip |
|---|---|---|---|---|
| 1010 | EE20 | 0 | 23 | FFEC |
| 1011 | EE20 | 0 | 34 | FFF3 |
| 1012 | EE20 | 0 | 40 | 0004 |

No change is required in the overflow table since the defect entry with the smallest difference remains as that with an address of Index=1012.

The present invention may be further described as follows:

A method of the present invention for storing a value includes a step 24 of obtaining the difference between the value and a value $k2^n$ if the value is greater than $2^n-1$. The value k is chosen as the smallest integer for the difference to be less than $2^n$. The differences are stored in a n-bit wide first memory in order of increasing magnitude of the values 26. Each of the differences is referenced by an address. For each k value, the address of the smallest difference is stored in a second memory as an overflow address 28.

The method may further include providing a first address to a first difference. This first difference is obtained from a first value. New addresses are assigned to the differences obtained from numbers greater than the first value. In one embodiment, for each k value, the address of the smallest difference stored in the second memory as an overflow address may be replaced with the new address of the smallest difference 32. The value may be a cylinder number.

In an alternative embodiment, the method may include obtaining an increment value by subtracting the first value from a second value. The second value is selected from the largest value that is less than the first value. In one embodiment, for each difference obtained from a value greater than the first value, a new difference is obtained by adding the increment value to the difference. The new differences are then stored at the respective new addresses 30.

For each new difference that is equal to or greater than $2^n$, a third difference between the new difference and a value $k2^n$ is obtained. The value k is chosen as the smallest integer for the third difference to be less than $2^n$. In one embodiment, the third differences are stored at the respective new addresses 30, and for each k value, the new address of the smallest third difference is stored as overflow address in the second memory 32. The value may be an accumulative slip count.

To retrieve the value, the address of the difference stored in a n-bit wide first memory is compared with an overflow address stored in a second memory 36. The value of $2^n$ is added to the difference if the address is equal to or greater than the overflow address 38. This is repeated for each overflow address less than the address 36.

While the invention has been described with reference to particular preferred embodiments, it will be appreciated by those skilled in the art that changes may be made with respect to form or detail without departing from the scope of the present invention. For example, the memory allocated to the storage of the number of interest has been described as being 16 bits long. The invention is just as applicable if the user has defined the memory allocation to be n bits long, where n is an integer. Where n bits is the allocated memory space in a main table, the largest number that can be stored by n bits alone will be $2^n-1$. Any number greater than that will be split into an n-bit value to be stored in the main table and an overflow value of at least 1.

What is claimed is:

1. In a disc drive having a disc formatted with a plurality of tracks, a read/write head positionable relative to the disc for reading from and writing to the disc, and circuitry for performing a method of storing values, the method comprising steps of:

(a) for each value greater than $2^n-1$, obtaining the difference between the value and a value $k2^n$, wherein k is chosen as the smallest integer for the difference to be less than $2^n$;

(b) storing the differences in a n-bit wide first memory in order of increasing magnitude of the values, wherein each of the differences is referenced by an address; and (c) for each k value, storing the address of the smallest difference in a second memory as an overflow address.

2. The method of claim 1 wherein the storing step (b) further includes steps of:

(d) providing a first address to a first difference, the first difference being obtained from a first value; and (e) assigning new addresses to the differences obtained from numbers greater than the first value.

3. The method of claim 2 further comprising, for each k value, a step (f) of replacing the overflow address with the new address of the smallest difference.

4. The method of claim 2 wherein the value is a cylinder number.

5. The method of claim 2 wherein the storing step (b) further includes steps of:

(g) obtaining an increment value by subtracting the first value from a second value, the second value being the largest value that is less than the first value;

(h) for each difference obtained from a value greater than the first value, obtaining a new difference by adding the increment value to the difference; and (i) storing the new differences at the respective new addresses.

6. The method of claim 5 further comprising steps of:

(j) for each new difference that is equal to or greater than $2^n$, obtaining a third difference between the new difference and a value $k2^n$, wherein k is chosen as the smallest integer for the third difference to be less than $2^n$;

(k) storing the third differences at the respective new addresses; and (l) for each k value, storing the new address of the smallest third difference in the second memory as the overflow address.

7. The method of claim 5 wherein the value is an accumulative slip count.

8. A method of retrieving a value from memory, the method comprising steps of:

(a) comparing an address associated with a difference related to the value from a n-bit wide first memory with an overflow address stored in a second memory; and (b) adding at least $2^n$ to the difference if the address is equal to or greater than the overflow address.

9. The method of claim 8 further comprising a step (c) of repeating the adding step (b) for each overflow address that is less than the address.

10. A method of storing information in an N-bit wide memory, the method comprising:

storing at least a portion of the information in a first memory; and storing an address associated to the information in the first memory in a second memory if the information is greater than N bits, the second memory corresponding to an overflow of the information.

11. The method of claim 10 further comprising the steps of:

retrieving information from an address of the first memory; and comparing the retrieved information address to at least one address in the second memory to determine an overflow.

* * * * *